United States Patent Office 3,094,457
Patented June 18, 1963

3,094,457
TOXIC O,O-DIMETHYL AND O,O-DIETHYL S-PENTACHLOROPHENYL PHOSPHOROTHIOATE
Gail H. Birum, St. Louis, Mo., assignor to Monsanto Chemical Company, St. Louis, Mo., a corporation of Delaware
No Drawing. Original application Jan. 8, 1957, Ser. No. 632,966. Divided and this application Nov. 16, 1961, Ser. No. 152,939
12 Claims. (Cl. 167—30)

This invention relates to two new compounds which are O,O-dimethyl S-pentachlorophenyl phosphorothioate and O,O-diethyl S-pentachlorophenyl phosphorothioate and which have the desirable property of having low mammalian toxicity, yet being useful as miticides and fungicides. This application is a division of copending application, Serial Number 632,966, filed January 8, 1957, now U.S. 3,046,296.

Other phosphorus-containing compounds are known such as "Chlorothion," malathion, and parathion which compounds are also known to be good miticides. I have discovered two new compounds, one of which is as active and the other more active than these known compounds as will be hereinafter shown.

It is an object of this invention to provide potent miticides which are suitable for use in the vicinity of human beings or even applied to food products designed for human consumption.

It is another object of this invention to provide a potent fungicide which is suitable for application in the presence of unprotected human beings and even on edible food products for human consumption.

It is a primary object of this invention to provide two new compositions of matter which are useful as miticides, fungicides, and for other uses.

These and other objects of the invention will become apparent as the detailed description of the invention proceeds.

By my invention, two new compounds are provided which are set forth by formula and written description as follows:

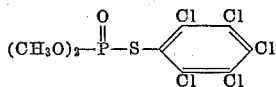

O,O-dimethyl S-pentachlorophenyl phosphorothioate and

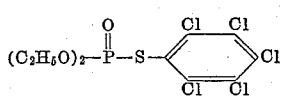

O,O-diethyl S-pentachlorophenyl phosphorothioate

These compounds have been found to be very effective miticides and have also shown fungicidal activity.

Three methods of preparing the novel compounds of the invention will be illustrated using the ethyl homolog for the illustration. It will, of course, be understood that the methyl homolog can be made in like manner.

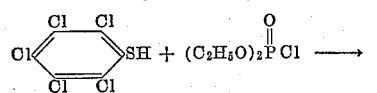

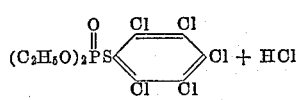

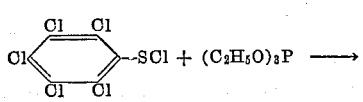

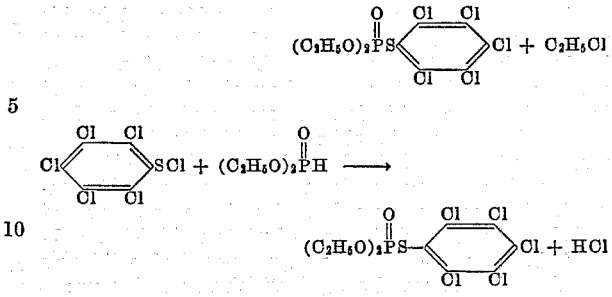

Of the three methods of preparing the compounds shown, perhaps the latter method is the most preferred from an economic standpoint. However, as indicated, all three methods will produce the desired compounds.

The invention will be more clearly understood from the following detailed description of specific example thereof:

EXAMPLE 1

This is an example of the preparation of pentachlorobenzenesulfenyl chloride from pentachlorothiophenol and chlorine.

A 3-liter flask was charged with 600 ml. of CCl$_4$ and 424 g. of pentachlorothiophenol. A rapid stream of Cl$_2$ was passed through sulfuric acid and over the surface of the material in the flask. The temperature increased spontaneously from 25 to 47° C. in about one hour and then dropped to 42° C. Heat was then applied to the flask contents and the flow of chlorine continued, maintaining the flask contents at about 55–60° C. for ¾ hour. There was no indication that any chlorine reacted after the exothermic reaction was over. A rapid stream of nitrogen was then passed through the reaction mixture for one hour, followed by the distillation of some of the CCl$_4$ at water aspirator pressure to remove the chlorine and HCl. For further details of the preparation of pentachlorobenzenesulfenyl chloride, my copending application, Serial No. 550,833, filed December 5, 1955, now U.S. 2,965,535, should be consulted.

EXAMPLE 2

This is an example of the preparation of O,O-diethyl S-pentachlorophenyl phosphorothioate.

In a 500-ml. flask, 100 ml. of benzene and 31.6 g. (0.1 mole) of pentachlorobenzenesulfenyl chloride, prepared in a manner similar to that shown in Example 1, were added. The flask and contents were cooled in ice water. To the cooled material in the flask, 19.9 g. (0.12 mole) of freshly fractionated triethyl phosphite was added over a period of about 0.2 hour at 8–14° C. About the theoretical amount of phosphite was required to decolorize the sulfenyl chloride—the reaction mixture remained slightly yellow. The solution was warmed to 40° C. and concentrated at water aspirator pressure to give 41.7 g. of white solid residue. A portion of this solid was recrystallized from benzene and hexane to give white crystals, M.P. 91–92° C. An elemental analysis of this recrystallized material was as follows:

|  | Found | Calcd. for $C_{10}H_{10}Cl_5O_2PS$ |
|---|---|---|
| Percent C | 29.01 | 28.6 |
| Percent H | 2.68 | 2.41 |
| Percent Cl | 42.04 | 42.3 |
| Percent P | 7.34 | 7.4 |

EXAMPLE 3

This is an example of the preparation of O,O-dimethyl S-pentachlorophenyl phosphorothioate.

The pentachlorobenzenesulfenyl chloride used in this example was prepared by a method similar to that used in Example 1. Benzene (100 ml.) and 27.5 g. (0.087 mole) of pentachlorobenzenesulfenyl chloride were placed in a flask and cooled in ice. A sample of 14.9 g. (0.12 mole) of trimethyl phosphite was added to the reaction mixture over a period of 0.3 hour at 8–12° C. The sulfenyl chloride was decolorized and a white solid separated. The mixture was filtered and the solid washed with benzene to give 11.8 g. of white solid, M.P. 145–147° C. A portion of the benzene-washed solid was submitted for elemental analysis which was as follows:

|  | Found | Calcd. for $C_8H_6Cl_5O_3PS$ |
|---|---|---|
| Percent C | 25.03 | 24.6 |
| Percent H | 1.85 | 1.55 |
| Percent P | 7.86 | 7.95 |
| Percent S | 8.37 | 8.2 |

Data showing the testing of the ethyl derivative is contained in Table I below. This data was obtained by spraying the particular organism shown using an emulsion having the concentration of the active ingredient as shown in the table.

An emulsion was prepared by grinding 0.1 g. of the ethyl derivative with 0.4 g. of wettable powder base (a wettable clay, "Attasorb," 80%; a substituted aromatic sulfonate, "Santomerse 80," 10%; sodium citrate $6H_2O$, 6%; disodium acid phosphate, 4%) in a No. 00 mortar. Small volumes of water (from a 200 cc. graduate) are added to the mixture which is gradually transferred to an Erlenmeyer flask. The mortar and pestle are rinsed thoroughly and the remaining portion of the 200 cc. of water added to the flask which is then stoppered and shaken thoroughly to form a wettable dispersion. This 0.05% preparation was later diluted with water to give the 0.013% and 0.0063% concentrations used in the experiment.

Potted bean plants which had been previously infested with the two-spotted spider mite *Tetranychus bimaculatus* were sprayed to run-off with the 0.013% and the 0.0063% emulsions and then placed in the greenhouse under ordinary conditions of sunlight and watering. Results of observations of the sprayed plants at the end of 48 hours are shown in Table I for the mobile and resting stage of the mite and at the end of one week for the eggs and the residual activity.

Table I

O,O-DIETHYL S-PENTACHLOROPHENYL PHOSPHOROTHIOATE

| Organism | Percent Concentration | |
|---|---|---|
| Two-spotted spider mite | 0.013 | 0.0063 |
| | Percent Kill | |
| Mobile Stages | 100 | 97 |
| Resting Stages | 100 | 0 |
| Eggs | 97 | 25 |
| Residual Activity | 97 | 0 |

An examination of the data of Table I indicates that the ethyl compound is an excellent miticide.

Table II below shows the testing of the methyl compound at a concentration of 0.1%. These tests were carried out in a manner similar to that used to obtain the data for Table I, except that the infested leaves were dipped in emulsion rather than sprayed.

Table II

O,O-DIMETHYL S-PENTACHLOROPHENYL PHOSPHOROTHIOATE

Organism: Percent kill
  Two-spotted spider mite—
    Mobile stages _____ 100
    Resting stages _____ 50
    Eggs _____ 80
    Residual activity _____ 80

An examination of the data in Table II indicates that the methyl compound is not quite as effective as the ethyl compound, but that it is an active miticide.

In Table III below, there is shown the comparison of the ethyl compound of Example 2 with three commercially-used effective miticides. The test results were obtained by the method used to obtain the data of Table I.

Table III

|  | Ethyl Compound | "Chlorothion" | Malathion | Parathion |
|---|---|---|---|---|
| Percent Concentration | 0.013 | 0.2 | 0.1 | 0.05 |
| Toxicology, mg./kg | 925 | 1,500 | 1,500 | 7.5 |

In Table III above, there is shown the percent concentration of the active ingredient required to give 100% kill of the mobile stages of the two-spotted spider mite. Also shown in this table, is the toxicology of these compounds which is described as rat acuteoral $LD_{50}$. This data is reported in milligrams taken orally required per kilogram weight of rat to give 50% kill of the rat test animals. "Chlorothion" is O,O-dimethyl O-(3-chloro-4-nitrophenyl) phosphorothioate. Malathion is O,O,-dimethyl S-(1,2-dicarbethoxyethyl) phosphorodithioate and parathion is O,O,-diethyl O-(4-nitrophenyl) phosphorothioate.

An examination of the data in Table III indicates that the ethyl compound has a low mammalian toxicity of the order of "Chlorothion" and malathion with a high miticidal activity appreciably better than parathion, which has a high mammalian toxicity. In other words, the ethyl compound is distinctly superior as miticide to these compounds in commerical use. The methyl compound of the invention would have a mammalian toxicity fully as low or lower than the ethyl compound, so this methyl compound is important along with the ethyl compound even though the methyl compound is not quite as toxic as miticide.

The ethyl compound was also tested as a fungicide and it showed promise as a fungicide in tests against wheat rust (*Puccinia rubigo-vera tritici*) at concentrations as low as 0.1% and against tomato wilt (*Fusarium lycopersici*) at concentrations as low as 10 p.p.m. The dimethyl compound was also tested as a fungicide and showed fungicidal activity against these same organisms but required a somewhat larger concentration to show fungicidal activity.

In the wheat rust test, six-day old wheat seedlings are placed in the moist chamber and sprayed with a fine mist of water. These plants are then inoculated by infected wheat plants which are "brushed" back and forth across the tops of the wet foliage of the plant being infected. After 48 hours at 70° F. (relative humidity, 100 percent), the plants are removed to greenhouse benches. Four days after inoculation, the plants are ready to be sprayed with the test compounds.

A one percent stock solution of the test chemical is diluted with water to obtain desirable concentrations. Initial screening begins at a concentration of 0.5 percent (5000 p.p.m.). Five ml. of the spray solution is sufficient to cover the plants in each pot to "run-off." A drop of a wetting agent which is a polyoxyalkylene derivative of sorbitan monolaurate, "Tween 20," is added to each 5 ml.-portion of test solution. The plants are then returned to the greenhouse benches and the disease incidence is noted 5 days later.

In the tomato wilt test, two-week old Bonny Best tomato seedlings are immersed in solutions containing 10 and 100 p.p.m. of the test compound. After 48 hours, the seedlings are removed and the root systems are rinsed thoroughly in tap water to remove any chemical residue. Approximately one-third of each lateral root system of each plant is severed and the wounded roots are dipped for 30 seconds in a suspension of Fusarium bud-cells. The inoculated plants are immediately potted in steamed-soil. Each treatment is replicated three times. Disease assessments are made when the controls exhibit marked Fusarium wilt symptons.

Thus, it is seen that the new compounds of the invention are effective miticides and fungicides. Normally it will be preferred to use these compounds in miticidal composition in concentrations within the range of about 0.001% to about 1%, depending upon the particular use for which the miticidal composition is designed, and in fungicidal compositions in about the same range, depending on the particular use for which the fungicidal composition is intended. Obviously these new compounds are even more valuable having both miticidal and fungicidal activity than if they had activity only specifically against mites or fungus, since there will be applications where the dual activity will be particularly advantageous. These new compounds may be used alone as the only active ingredient in miticidal and/or fungicidal compositions, or they may be mixed with other active insecticidal and/or fungicidal ingredients in compositions. They will be effective against other species of mites such as the European red mite, cheese mites, citrus red mite, cydamen mite, Atlantic mite, etc., as well as against the two-spotted spider mite.

The new products of the invention are generally applied for biocidal use in the form of sprays and aerosols. Useful sprays may be prepared by dispersing the present products in water with the aid of a wetting agent, to prepare aqueous dispersions which can be employed as sprays; in other procedures, the products can be applied to, e.g., mite and/or fungus hosts as oil-in-water emulsion sprays. The new products can also be dissolved in liquified gases, such as fluorochloroethanes or methyl chloride, and applied to plants, etc., from aerosol bombs. Instead of employing liquids as carriers and diluents, miticidal and/or fungicidal dusts which contain the new compounds as active ingredients can be prepared, e.g., by incorporating the active compound with a solid carrier such as talc, bentonite, fuller's earth, etc.

The new compositions of the invention may also be used for a variety of industrial and agricultural purposes, e.g., as lubricant additives, textile treating agents, fire-retardant plasticizers, as well as for biological toxicant purposes including insecticidal.

Although the invention has been described in terms of a specified apparatus which is set forth in considerable detail, it should be understood that this is by way of illustration only, and that the invention is not necessarily limited thereto, since alternative embodiments will become apparent to those skilled in the art in view of the disclosure. Accordingly, modifications are contemplated which can be made without departing from the spirit of the described invention or of the scope of the appended claims.

What is claimed is:

1. A miticidal toxicant composition comprising an inert carrier and as an essential effective ingredient a compound taken from the class consisting of a miticidally effective amount of O,O-dimethyl S-pentachlorophenyl phosphorothioate and O,O-diethyl S-pentachlorophenyl phosphorothioate.

2. A miticidal toxicant composition comprising an inert carrier and as an essential effective ingredient a miticidally effective amount of O,O-dimethyl S-pentachlorophenyl phosphorothioate.

3. A miticidal toxicant composition comprising an inert carrier and as an essential effective ingredient a miticidally effective amount of O,O-diethyl S-pentachlorophenyl phosphorothioate.

4. The method of destroying mites which comprises exposing said mites to a toxic amount of a compound taken from the class consisting of O,O-dimethyl S-pentachlorophenyl phosphorothioate and O,O-diethyl S-pentachlorophenyl phosphorothioate.

5. The method of destroying mites which comprises exposing said mites to a toxic amount of O,O-dimethyl S-pentachlorophenyl phosphorothioate.

6. The method of destroying mites which comprises exposing said mites to a toxic amount of O,O-diethyl S-pentachlorophenyl phosphorothioate.

7. A fungicidal composition comprising an inert carrier and as an essential effective ingredient a fungicidally effective amount of a compound taken from the class consisting of O,O-dimethyl S-pentachlorophenyl phosphorothioate and O,O-diethyl S-pentachlorophenyl phosphorothioate.

8. A fungicidal composition comprising an inert carrier and as an essential effective ingredient a fungicidally effective amount of O,O-dimethyl S-pentachlorophenyl phosphorothioate.

9. A fungicidal composition comprising an inert carrier and as an essential effective ingredient a fungicidally effective amount of O,O-diethyl S-pentachlorophenyl phosphorothioate.

10. The method of inhibiting the growth of fungus which comprises exposing said fungus to a toxic amount of a compound selected from the class consisting of O,O-dimethyl S-pentachlorophenyl phosphorothioate and O,O-dimethyl S-pentachlorophenyl phosphorothioate.

11. The method of inhibiting the growth of fungus which comprises exposing said fungus to a toxic amount of O,O-dimethyl S-pentachlorophenyl phosphorothioate.

12. The method of inhibiting the growth of fungus which comprises exposing said fungus to a toxic amount of O,O-diethyl S-pentachlorophenyl phosphorothioate.

References Cited in the file of this patent

UNITED STATES PATENTS

| | | |
|---|---|---|
| 2,266,514 | Romieux | Dec. 16, 1941 |
| 2,506,344 | Cleary | May 2, 1950 |
| 2,542,604 | Weisel et al. | Feb. 20, 1951 |
| 2,579,434 | Kenaga | Dec. 18, 1951 |
| 2,599,375 | Drake | June 3, 1952 |
| 2,599,512 | Drake | June 3, 1952 |
| 2,599,515 | Moyle | June 3, 1952 |
| 2,599,516 | Moyle | June 3, 1952 |
| 2,611,729 | Bartlett | Sept. 23, 1952 |
| 2,690,450 | Gilbert et al. | Sept. 28, 1954 |
| 2,716,657 | Bretschneider | Aug. 30, 1955 |
| 2,722,539 | Anderson | Nov. 1, 1955 |
| 2,724,718 | Stiles | Nov. 22, 1955 |
| 2,732,394 | Coates | Jan. 24, 1956 |
| 2,761,806 | Boyer | Sept. 4, 1956 |
| 2,770,567 | Wedemeyer | Nov. 13, 1956 |
| 2,807,637 | Slagh | Sept. 24, 1957 |

FOREIGN PATENTS

| | | |
|---|---|---|
| 5,595 | Japan | July 26, 1957 |
| 791,824 | Great Britain | Mar. 12, 1958 |

OTHER REFERENCES

Melnikov et al.: J. Gen. Chem., U.S.S.R. (English translation) 23, pages 1419–1423 (1953).